United States Patent [19]

Rumierz

[11] 4,146,487

[45] Mar. 27, 1979

[54] LUBRICATING COMPOSITION

[75] Inventor: John R. Rumierz, King of Prussia, Pa.

[73] Assignee: SKF Industries, Inc., King of Prussia, Pa.

[21] Appl. No.: 817,147

[22] Filed: Jul. 20, 1977

[51] Int. Cl.² .................. C10M 5/00; C10M 7/00; F16D 69/00; F16C 19/02
[52] U.S. Cl. ................................. 252/12; 252/12.2
[58] Field of Search .............. 252/12, 12.2, 12.4, 252/12.6

[56] References Cited

U.S. PATENT DOCUMENTS

| | | | |
|---|---|---|---|
| 2,825,721 | 3/1958 | Hogan et al. | 252/59 |
| 3,541,011 | 11/1970 | Darr's et al. | 252/12 |
| 3,547,819 | 12/1970 | Darr's et al. | 252/12 |
| 3,729,415 | 4/1973 | Darr's et al. | 252/12 |

*Primary Examiner*—Irving Vaughn
*Attorney, Agent, or Firm*—Eugene E. Renz, Jr.

[57] ABSTRACT

Lubricating compositions and shaped articles composed thereof for use in bearings and the like are described which consist essentially of about 50 to about 90% by weight of an oil of lubricating viscosity and about 50 to about 10% by weight of polymethylpentene having an average molecular weight in the range from about 3 to about 5 million; the oil being a mineral oil, a diester oil or preferably a synthetic hydrocarbon oil, and having a viscosity in the range from about 15 to about 300 millimeters²/second (mm²/s) at 38° C. (100° F.); the shaped articles can be formed in situ in an article such as a bearing or a mold by heat curing a physical mixture of the oil and polymethylpentene at a temperature somewhat above the initial softening point of the latter for about 45 to 75 minutes and allowing the mixture to cool to form a firm, tough, solid gel having an oily surface provided by oil exuding from the gel to thus produce a lubricating mass operable for extended periods of time at temperature up to about 160° C. (320° F.). These shaped lubricating masses may be used as formed or may be shaped further by conventional physical means.

21 Claims, No Drawings

LUBRICATING COMPOSITION

BACKGROUND OF THE INVENTION

It has long been recognized that it would be desirable in many industries and arts to provide a lubricating product which would be capable of releasing lubricant over a prolonged period of time under use conditions. For example, self-lubricating bearings are of great value in the automotive, aviation and other industries. It has also been recognized that it would be highly desirable for such lubricants to be self-supporting, i.e. to have sufficient inherent mechanical strength to actually constitute or at least form a sort of the lubricating structure.

THE PRIOR ART

Self-supporting lubricating compositions and articles and methods for producing them have been described in the prior art. For example, Davis and Gilles U.S. Pat. Nos. 3,729,415, issued Apr. 24, 1973; 3,547,819, issued Dec. 15, 1970; and 3,541,011, issued Nov. 17, 1970; all disclose lubricating compositions comprising a hydrocarbon oil and polyethylene in various forms, including self-supporting gels which exude oil and thus have an oily lubricating surface. British Pat. No. 1,173,123 published Sept. 4, 1969, is based on the foregoing Davis and Gilles U.S. patents, but suggests that polyolefins other than polyethylene, such as polypropylene and polybutylene may be used in such compositions, although all of the working examples actually employ only polyethylene.

Agens U.S. Pat. No. 3,135,564, issued June 2, 1964, discloses an anti-friction bearing and a method of making it which contains a formed-in-place, unitary, solid, plastisol containing a lubricant completely filling an annular space to provide lubrication.

Scott and Swartz U.S. Pat. No. 3,913,992, issued Oct. 21, 1975, discloses a method and apparatus employing a mass of grease placed on a dispensing surface on a rotating member in such a way that the centrifugal force of the grease against the dispensing surface causes oil to be released from the grease under use conditions.

It will be seen from the foregoing that self-supporting lubricating compositions and articles such as bearings containing them have been developed previously. However, the existing compositions of this type have been found to be useful only at operating temperatures no higher than about 105° C. (221° F.), since they become tacky, lose their lubricity and are discharged leaving a dry bearing at temperatures of about 110° C. (230° F.) or higher.

It is, therefore, a primary object of the present invention to provide improved lubricating compositions capable of providing lubrication for prolonged periods of time at operating temperatures above 105° C. (221° F.).

BRIEF DESCRIPTION OF THE INVENTION

The foregoing and other objects of the invention which will become apparent hereinafter are achieved by providing compositions and articles formed therefrom which consist essentially of about 50 to 90% by weight of an oil of lubricating viscosity and from about 50 to about 10% by weight of polymethylpentene (PMP) having an average molecular weight in the range from about 3 to about 5 million. These compositions are provided in the form of firm tough, solid gels having an oily surface provided by the exudation of oil from the gels. The preferred compositions of the invention are made from synthetic hydrocarbon oils having a viscosity in the range from about 20 to about 260 $mm^2/s$ measured at a temperature of 38° C. (100° F.). Other known lubricating oils of comparable viscosity may also be employed including the diester oils described in Military Specifications MIL-L-23699B and MIL-L-7808G. These refer to aircraft turbine engine lubricants. Products qualified under these specifications are (respectively) Exxon ETO 2380 and Exxon ETO 2389.

Naturally occuring mineral oils may also be employed, but less desirably, since they tend to deteriorate at the high temperatures employed in the preparation of the new lubricating compositions. Especially preferred compositions are obtained from synthetic hydrocarbon oils having a viscosity in the range from about 30 to about 170 $mm^2/s$.

The polymeric component of the new compositions is known in commerce as polymethylpentene (hereinafter PMP) and generally has an average molecular weight in the range from about 3 to about 5 million; polymer having an average molecular weight of about 4 million having been found to provide excellent products. This material is available and useful in finely particulate form, i.e. about 60 to about 140 mesh.

In preparing the new compositions, the PMP is simply blended with the oil in a conventional blender to form a physical mixture. As noted above, this mixture may contain about 50 to about 90% oil and about 50 to about 10% PMP, based on the weight of the total mixture. Preferred proportions are about 65 to about 75% oil and about 35 to about 25% PMP; especially desirable products contain about 70% oil and about 30% PMP in the mixture and in the final product.

The physical mixture of oil and PMP is then introduced to a mold or into the cavity of a bearing or other article in which it is desired to produce a lubricating mass in situ. The mixture is then cured by heating it to a temperature in the range from about 220° C. (428° F.) to about 260° C. (500° F.); the exact temperature in the range from about 10° C. (18° F.) to about 50° C. (90° F.) above the initial softening temperature of the particular PMP polymer in the mixture, depending on the liquid phase used. This curing temperature is maintained for about 45 to about 75 minutes until the mixture becomes transparent and sticky. This end point may be determined visually, by trial and error, or by testing the mixture with a metal rod to which the mixture will adhere when properly cured. The final product is then obtained by allowing the cured mixture to cool whereupon it forms a firm, tough, solid gel conforming in shape to the mold or cavity of a bearing or other article in which it was heated. Where the shaped lubricating mass is formed in situ in a bearing, for example, it is used in that form. Molded shaped articles may be shaped further, if desired, by conventional cutting, abrading or other procedures. The resulting composition or article has an oily surface provided by the exudation of oil from the gel. This exudation of oil continues until the oil supply is exhausted, thus providing prolonged lubrication of any surface in contact with the gel. The new compositions have been found capable of withstanding prolonged use at operating temperatures of up to 145° C. (293° F.) and, for shorter periods, at up to 160° C. (320° F.). The oil-polyethylene gel lubricating compositions of the prior art, on the other hand, are inoperable at such elevated temperatures, since they become sticky and are discharged from bearings, leaving a dry bearing, at operating temperatures of only about 105° C. (221°

F.) to 110° C. (230° F.). It will be apparent to those skilled in the art, therefore, that the new PMP containing lubricant compositions and articles, constitute a distinct improvement over the prior art for use at operating temperatures above 105° C. (221° F.).

The physical characteristics of the gels of the present invention vary somewhat depending upon the average molecular weight of the PMP and the proportion of that material in the final lubricating composition. Increasing the molecular weight and concentration of PMP in the composition increases the firmness, toughness and rigidity of the gel. These characteristics are correspondingly decreased by decreasing the molecular weight and concentration of the PMP in the composition. It will be seen, therefore, that by varying the molecular weight and concentration of the PMP, lubricating compositions can be produced which are especially adapted for use in particular application.

DETAILED DESCRIPTION OF THE INVENTION

EXAMPLE 1

To illustrate the preferred practice of the invention a shaped mass of lubricating gel was prepared containing 70% oil and 30% PMP by weight of the total composition. More specifically 40 grams of PMP was mixed with 93 grams of lubricating oil in a conventional blender for about one minute until a homogeneous mixture was obtained. The PMP was in the form of a 60-120 mesh powder which is commercially available under the trade name "TPX Polymer" from Mitsui Petrochemical Industries, Mitsui & Company Incorporated. This PMP has an average molecular weight of 4 million. The oil was a synthetic hydrocarbon oil available from Mobil Oil Corporation under the trade name "SHC624" and had a viscosity of 33 mm$^2$/s at 38° C. (100° F.).

After blending, the oil-PMP mixture was charged to a suitable mole with provision for heating, heated to 218° C. (425° F.) and maintained at that temperature for 60 minutes. The end is reached when the mixture becomes transparent and self-cohesive.

Heating was then discontinuedand discontinued and mold and its contents allowed to cool to ambient temperature. When the mold was opened, a self-supporting, shaped mass of lubricating composition was obtained in the form of a firm, tough, solid gel having an oily surface caused by exudation of oil from the gel.

EXAMPLE 2

The general procedure of Example 1 was repeated with the exception that 10% PMP was mixed with 90% Mobil SHC 624. The resulting shaped lubricating gel mass was similar to that obtained in Example 1 but was much more flexible due to the decreased percentage of polymer present.

EXAMPLE 3A

The general procedure of Example 2 was repeated with the exception that 50% PMP was mixed with 50% Mobil SHC 624. The cure temperature was again 218° C. (425° F.). However, the end point was not obtained until 180 minutes of cure. The resulting shaped lubricating gel mass was similar to that obtained in Example 1 but was much harder and less oil exuding. These effects are attributable to the increase in polymer content.

EXAMPLE 3B

The general procedure of Example 3A was repeated with the exception that the cure was 232° C. (450° F.) for one hour. A similar lubricating gel mass was obtained. The reduction in curing time was related to the increase in curing temperature.

EXAMPLE 4

The general procedure of Example 1 was repeated using the same PMP but substituting Mobil "SHC 629" for the oil used previously. This oil differs primarily in having a viscosity of 160 mm$^2$/s at 38° C. (100° F.). No end point of the cure cycle was reached after 240 minutes using a 218° C. (425° F.) cure temperature. No shaped mass was formed. This is attributable to the greatly increased viscosity of the lubricant which hinders intimate mixing during the cure cycle at 218° C. (425° F.).

EXAMPLE 5

The general procedure of Example 4 was repeated except a cure temperature of 254° C. (490° F.) was employed. An end point was reached in 45-50 minutes. The resulting shaped lubricating gel was similar to that obtained in Example 1.

EXAMPLE 6

The general procedure of Example 1 was repeated with the exception that diester lubricant Exxon ETO 2380 was substituted for the previously used oil. The cure cycle was 252° C. (485° F.) for 60 minutes. The resultant shaped mass was obtained in the form of a tough, resilient solid gel with an oily surface caused by the exudation of oil from the gel.

EXAMPLE 7

The general procedure of Example 1 was repeated with the exception that Mobil DTE XH, a mineral oil based lubricant, with a viscosity of 138 mm$^2$/s at 38° C. (100° F.) was substituted for the previously used oil. The resultant shaped mass was grainy and discolored due to substantial oxidation of the Mobil DTE XH.

EXAMPLE 8

A functional test was designed in order to assess the relative merits of the new lubricating compositions and similar oil-polyethylene lubricating gels of the prior art. A standard 6205 ball bearing having a fixed outer ring and a rotatable inner ring was provided with an intermediate lubricant mass to be tested having a surface in contact with the rotating inner ring. This apparatus was then used in a series of tests as follows:

(a) The bearing was loaded with a lubricating mass consisting of an oil-polyethylene gel of the prior art such as those described in Davis and Gillies U.S. Pat. No. 3,541,011. The exact composition of the gel was 30% polyethylene (Hercules UHMW 1900) and 70% Mobil DTE XH oil.

The speed of rotation of the inner ring of the bearing was increased step-wise in 3600 rpm increments, allowing the apparatus to run until the operating temperature had stabilized at each step. No extraneous heat was supplied, i.e. the test was run under ambient temperature conditions.

The bearing speed reached 7200 rpm at which speed the oil-polyethylene gel lubricant failed by the lubricant mass being expelled from the bearing. The bearing temperature was 49° C. (120° F.) at 7200 rpm.

(b) The foregoing procedure was repeated after substituting an oil-PMP lubricant gel of Example 5 in the bearing. The bearing was run at 3600 rpm, 7200 rpm, and 8500 rpm with the bearing temperature allowed to stabilize at each step. Lubricant failure occurred after 1.5 hours running at 8500 rpm and a bearing temperature of 110° C. (230° F.), indicating that the oil-PMP lubricating compositions are as good as or better than, the oil-polyethylene gels of the prior art under ambient conditions.

(c) The same standard 6205 ball bearing was charged with an oil-polyethylene lubricating mass of 30% polyethylene and 70% Mobil DTE XH oil and a test was conducted at a constant bearing speed of 3600 rpm under a thrust load of 665 newton (150 lbs.). In this test, however, the operating temperature was increased in discrete steps after ambient running for 72 hours. The extraneous heat was supplied by mounting the bearing in a housing containing electrical cartridge heaters which raised the temperature of the bearing outer ring.

Under these conditions the oil-polyethylene lubricant composition of the prior art failed upon reaching a temperature of 100° C. (212° F.).

(d) The procedure of Example 8 (c) was repeated substituting an oil-PMP lubricating mass according to Example 5. In this test the bearing was run at ambient temperature for 140 hours. Then the temperature was raised in controlled increments over a period of four hours until an operating temperature of 149° C. (300° F.) was reached. The bearing was permitted to run for an additional 670 hours at a speed of 3600 rpm and 149° C. (300° F.) operating temperature before terminating the test, without failure.

It is clear from the foregoing that the oil-PMP lubricating compositions of the present invention are markedly superior to the oil-polyethylene compositions of the prior art at operating temperatures above 93° C. (200° F.).

It will be apparent to those skilled in the art that a wide variety of oils of lubricating viscosity in the range of 15 to 300 mm$^2$/s or more can be employed in the compositions of the present invention. The invention is operable with lubricants having a mineral oil base, diester oil base, or synthetic hydrocarbon oil base and all three types are represented in the examples.

One of the advantages of the present invention is that the PMP-oil mixtures can be stabilized so that they may be shipped in that form prior to being fully gelled by the purchaser or final user. This is done by partially curing the PMP-oil mixture by heating to a temperature of about 28° to 42° C. (50° to 75° F.) below the curing temperature of the particular mixture and maintaining this temperature for a period of about 15 to about 20 minutes to form a partially gelled and stabilized product of grease-like consistancy. After shipping and/or storage such stabilized products are curable in the usual way to provide the shaped relatively rigid gels of the invention. For example, the PMP oil mixture of Example 5, containing Mobil SHC 629 which cured at 254° C. (490° F.) would be heated to about 224° C. (435°F.) for 15 to 20 minutes to obtain a stabilized mixture for shipping.

The curing temperature of the PMP-oil mixtures varies somewhat depending on the identity of the particular oil and its viscosity. In general the higher the viscosity of the oil, the higher the temperatre required to achieve an adequate cure. The optimum curing temperature for any particular PMP-oil mixture can of course, be determined by trial and error or by experience. Inasmuch as the compositions of the present invention are curable at temperatures within the range of about 220° C. (428° F.) to about 260° C. (500° F.), they may be stabilized by heating for 15 to 20 minutes at temperatures within the range from about 178° C. (353° F.) to about 218° C. (425° F.).

It should be understood that all proportions herein are expressed in percentages based on the total oil and PMP content, not including any additives which may be present.

We claim:

1. A composition consisting essentially of about 50 to about 90% by weight of an oil of lubricating viscosity and about 50 to about 10% by weight of polymethylpentene having an average molecular weight from about 3 to about 5 million; said composition being in the form of a firm, tough, solid gel having an oily surface provided by oil exuding from said gel.

2. A composition of claim 1 wherein the oil is selected from the group consisting of mineral oil, diester oil and synthetic hydrocarbon oil.

3. A composition of claim 2 wherein the oil is a synthetic hydrocarbon oil.

4. A composition of claim 2 wherein the oil has a viscosity from about 5 to about 300 mm$^2$/s at 38° C. (100° F.).

5. A composition of claim 4 wherein the oil content is about 65 to about 75% by weight and the polymethylpentene is about 35 to about 25% by weight.

6. A composition of claim 4 wherein the oil content is about 70% by weight and the polymethylpentene content is about 30% by weight.

7. A composition of claim 4 wherein the oil has a viscosity of about 30 to about 170 mm$^2$/s and the polymethylpentene has an average molecular weight of about 4 million.

8. A shaped article comprising a composition of claim 1.

9. A shaped article comprising a composition of claim 2.

10. A shaped article comprising a composition of claim 3.

11. A shaped article comprising a composition of claim 4.

12. A shaped article comprising a composition of claim 5.

13. A shaped article comprising a composition of claim 6.

14. A shaped article comprising a composition of claim 7.

15. A partially cured composition consisting essentially of a mixture of about 50 to about 90% by weight of an oil of lubricating viscosity and about 50 to about 10% by weight of polymethylpentene having an average molecular weight of from about 3 to about 5 million, said composition having been stabilized for shipping or storage by partial curing thereof by heating for about 15 to 20 minutes at a temperature of about 28° to 42° C. (50° to 75° F.) below its curing temperature.

16. A composition of claim 15 wherein the oil is a synthetic hydrocarbon oil.

17. A composition of claim 15 wherein the oil has a viscosity from about 15 to about 300 mm$^2$/s at 38° C. (100° F.).

18. A composition of claim 15 wherein the oil content is about 65 to 75% by weight and the polymethylpentene content is about 35 to about 25% by weight.

19. A composition of claim 17 wherein the oil content is about 70% by weight and the polymethylpentene content is about 30% by weight.

20. A composition of claim 17 wherein the oil has a viscosity of about 30 to about 170 mm$^2$/s, and the polymethylpentene has an average molecular weight of about 4 million.

21. An ungelled composition consisting essentially of a mixture of about 50 to about 90% by weight of an oil of lubricating viscosity and about 50 to about 10% by weight of polymethylpentene having an average molecular weight from about 3 to about 5 million.

* * * * *

UNITED STATES PATENT AND TRADEMARK OFFICE
CERTIFICATE OF CORRECTION

PATENT NO. : 4,146,487
DATED : March 27, 1979
INVENTOR(S) : John R. Rumierz

It is certified that error appears in the above-identified patent and that said Letters Patent are hereby corrected as shown below:

Column 3, line 44; delete the first "discontinued and"
Column 3, line 44; after "and" insert --the--

Claim 4, line 28; correct the numeral "5" to --15--

Signed and Sealed this

Thirty-first Day of July 1979

[SEAL]

Attest:

Attesting Officer

LUTRELLE F. PARKER
*Acting Commissioner of Patents and Trademarks*